UNITED STATES PATENT OFFICE 2,673,853

($\beta,\beta$-DIARYLACRYLYLOXY)-ALKYL-AMMONIUM SALTS

Kurt Rorig, Chicago, Ill., assignor to G. D. Searle & Co., Chicago, Ill., a corporation of Illinois No Drawing. Application March 25, 1952, Serial No. 278,507

12 Claims. (Cl. 260—294.3)

The present invention relates to a new group of quaternary ammonium salts and, more particularly, to the ($\beta,\beta$-diarylacrylyloxy)alkylammonium salts which can be represented by the structural formula

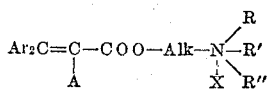

wherein Ar is an aryl radical, A is either hydrogen or a lower alkyl radical, X is an anion, R is an aliphatic type radical, and NR'R" is either a lower dialkylamino radical or a nitrogen-containing heteromonocyclic radical.

In the foregoing structural formula Ar can be a lower aryl radical of from 6 to 10 carbon atoms such as phenyl, tolyl, xylyl, and naphthyl. The radical A is either hydrogen or a lower alkyl radical such as methyl, ethyl, propyl and the like. The radical Alk is a lower bivalent saturated aliphatic hydrocarbon radical and includes such straight chain or branch chain hydrocarbon radicals as ethylene, propylene, butylene, amylene, hexylene and polymethylene radicals such as trimethylene, tetramethylene, pentamethylene and hexamethylene.

The radical R can be a lower alkyl radical such as methyl, ethyl, propyl, butyl, amyl, and hexyl wherein the propyl, butyl, amyl and hexyl radicals can be of the straight chain and branch chain type, as well as a lower aralkyl radical such as benzyl and phenethyl. The radicals R' and R" can be lower alkyl radicals of the foregoing type. The radical NR'R" can also be a saturated nitrogen-containing heterocyclic radical attached to the radical Alk through a nitrogen in the heterocycle; examples of such heterocycles are N-piperidino, N-lupetidino, N-pyrrolidino, N-morpholino, N-thiamorpholino and N'-alkyl-N-piperazino radicals.

The radical X represents one equivalent of an anion such as chloride, bromide, iodide, sulfate, methylsulfate, ethylsulfate, benzenesulfonate, toluenesulfonate, phosphate, citrate, lactate, ascorbate, tartrate, maleate and the like. The nature of the anion is of relatively minor importance since the cation becomes associated with other anions in vivo.

The quaternary ammonium salts of this invention are valuable medicinal agents, particularly as inhibitors of autonomic nervous functions. These salts inhibit the transmission of autonomic nerve impulses through both sympathetic and parasympathetic ganglia thus producing a chemical equivalent of surgical sympathectomy. They are useful in the control of gastroduodenal ulcer and other gastro-intestinal diseases associated with autonomic hyperactivity. In their effect on the intestines these salts differ from the corresponding tertiary bases and their simple addition salts, which have a spasmolytic effect only at the site of the affected organ, in that the quaternary salts prevent the nerve impulses from reaching the neuro-effector junction and producing damage at the irritated target organ.

The compounds which constitute my invention can be prepared by a number of methods. A convenient method consists in the transesterification of a lower alkyl ester of the diarylacrylic acid with the corresponding dialkylaminoalkanol or N-(hydroxyalkyl)heterocycle; the resulting ester is then quaternized by treatment with the corresponding organic ester.

Another method consists in the treatment of the diarylacroyl halides with alcohols of the foregoing type. Esterification can likewise be accomplished by treatment of the $\beta,\beta$-diarylacrylic acid with a haloalkyldialkylamine. Still another method consists in the dehydration with formic acid of the hydracrylates of the type shown in the experimental part below.

The following examples describe in detail certain of the compounds which constitute this invention and the methods for their production. However, this invention is not to be construed as limited thereby in spirit or in scope. It will be apparent to organic chemists that many modifications in materials and methods may be made without departing from the invention. In these examples temperatures are given in degrees centigrade (° C.), quantities are indicated in parts by weight, and pressures in millimeters (mm.) of mercury.

Example 1

A solution of 48 parts of $\beta,\beta$-diphenylacrylic acid chloride in 450 parts of benzene is treated with 18 parts of $\beta$-hydroxyethyldimethylamine. There is an immediate exothermic reaction which is completed by heating at reflux temperature for 5 hours. The reaction mixture is extracted with dilute hydrochloric acid and the extract is washed with ether, rendered alkaline by addition of potassium carbonate and extracted with ether. This ether extract is dried over anhydrous calcium sulfate and evaporated, yielding the $\beta$-dimethylaminoethyl ester of $\beta,\beta$-diphenylacrylic acid as an oil which is distilled at about 154–155° C. and 0.3 mm. pressure. Treatment of an ether solution of this base with an alcoholic solution of hydrogen chloride yields the slightly hygroscopic crystalline hydrochloride which, recrystallized from a mixture of ethanol and ether, melts at about 153-156° C.

13 parts of the above basic ester are dissolved in butanone and treated by addition of 8 parts of methyl bromide. Immediate precipitation of the (β,β-diphenylacrylyloxy) ethyltrimethylammonium bromide occurs. The white salt is collected on a filter, washed and dried. It melts at about 178-180° C. and has the structural formula

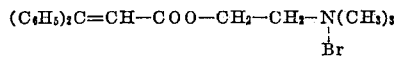

Replacement of the methyl bromide by 10.5 parts of benzyl chloride yields the (β,β-diphenylacrylyloxy) ethyldimethylbenzylammonium chloride in the form of small, clear prisms. This salt has the structural formula

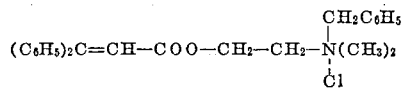

Example 2

A solution of 112 parts of β,β-diphenylacrylic acid and 68 parts of β-chloroethyldiethylamine and 750 parts of isopropanol is heated at reflux temperature for 6 hours and concentrated to one-half of its original volume. After cooling the precipitate is collected on a filter. The hydrochloride of the β-diethylaminoethyl β,β-diphenylacrylate thus obtained melts at 159-163° C. upon recrystallization from isopropanol.

235 parts of this hydrochloride are dissolved in ice cold water. The solution is rendered alkaline by addition of potassium carbonate and extracted with ether. This extract is dried over anhydrous potassium carbonate, filtered and evaporated. The residue is dissolved in acetone, treated with 120 parts of methyl bromide and heated to 85° C. for 18 hours. Recrystallized from chloroform and ethyl acetate, the (β,β-diphenylacrylyloxy) ethyldiethylmethylammonium bromide melts at about 146-147° C. It has the structural formula

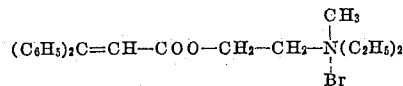

Example 3

A solution of 64 parts of β-hydroxyethyl-n-butylamine and 51 parts of ethyl β,β-diphenylacrylate in 300 parts of xylene is heated at reflux temperature. Upon addition of 0.5 part of sodium there occurs a vigorous transesterification reaction and the azeotropic mixture of ethanol and xylene is distilled off. The residue is washed with water, dried over anhydrous sodium sulfate and distilled. The dibutylaminoethyl ester of diphenylacrylic acid is obtained as a golden yellow oil distilling at about 192-193° C. and 0.3 mm. pressure. It forms a hydrochloride which, recrystallized from a mixture of ethanol and ether, melts at about 113-114° C.

A solution of 15 parts of the basic ester and 10 parts of methyl bromide in 80 parts of butanone is heated at 85° C. in a shielded pressure reactor for 36 hours. After cooling and treatment with ether an oil separates which solidifies on scratching. Recrystallized from a mixture of chloroform and ethyl acetate the (β,β - diphenylacrylyloxy) ethyldibutylmethyl- ammonium bromide melts at about 131-132° C. It has the structural formula

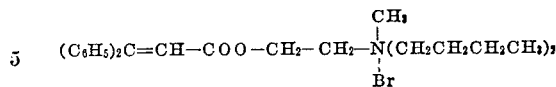

Example 4

20 parts of β,β-diphenylacrylic acid are converted to the acid chloride with 250 parts of thionyl chloride and, after removal of the excess of the thionyl chloride, the acid chloride is taken up in benzene and treated with one equivalent of 1-dimethylamino-2-propanol. The mixture is heated at reflux temperature for 4 hours and then treated with water. The aqueous layer is separated, rendered alkaline by addition of potassium carbonate and extracted with ether. This extract is evaporated under vacuum to yield the β-dimethylamino-α-methylethyl ester of β,β-diphenylacrylic acid which distils at about 154-156° C. and 0.3 mm. pressure. Its hydrochloride melts at about 170-171° C.

A solution of 10 parts of the basic distillate and 10 parts of diethyl sulfate in 100 parts of butanone is heated at 50° C. for an hour and chilled. The resulting oil, upon treatment with ether, crystallizes to form the (β,β-diphenylacrylyloxy) isopropyldimethylethylammonium sulfate in the form of light yellow crystals. This salt has the structural formula

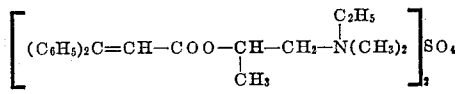

Example 5

A solution of 455 parts of γ-hydroxypropyldiethylamine and 504 parts of ethyl β,β-diphenylacrylate in 2800 parts of xylene is treated with 7 parts of sodium metal and heated gently at reflux temperature for 90 minutes. The azeotropic mixture of xylene and ethanol is gradually distilled off and replaced by xylene. The final xylene solution is washed with water, treated with an equal volume of ether and dried over anhydrous sodium sulfate, filtered and evaporated. The γ-diethylaminopropyl β,β-diphenylacrylate thus obtained is distilled at about 173-182° C. and 0.3 mm. pressure. It forms a hydrochloride which, recrystallized from isopropanol, melts at about 102-104° C.

A solution of 150 parts of the distillate in 800 parts of butanone is treated with 100 parts of methyl bromide at room temperature. Crystals form within 10 minutes. Upon recrystallization from a mixture of chloroform and ethyl acetate, the (β,β-diphenylacrylyloxy) propyldiethylmethylammonium bromide melts at about 110-112° C. This very hygroscopic salt has the structural formula

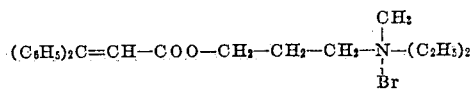

Example 6

A solution of 154 parts of α-methyl-β,β-diphenylacrylic acid, 136 parts of β-chloroethyldiethylamine and 600 parts of hot isopropanol is heated at reflux temperature for 20 hours and filtered to remove a small quantity of dimer. The filtrate is concentrated by evaporation and the crystalline precipitate is collected on a filter, washed with ether and dried. Recrystallized from ethanol and a very large quantity of ether, the hydrochloride of the β-diethylaminoethyl ester of α-methyl-β,β-diphenylacrylic acid is obtained which melts at about 144–145° C. An aqueous solution of the salt is rendered alkaline by addition of potassium carbonate and extracted with ether. This ether extract is dried over anhydrous potassium carbonate, filtered and evaporated to yield the free base. 10 parts of this base are dissolved in 100 parts of butanone and treated with 12 parts of propyl iodide. Within a short time the (α-methyl-β,β-diphenylacrylyloxy)ethyldiethylpropylammonium iodide separates as an oil which solidifies into yellowish needles upon chilling. It has the structural formula

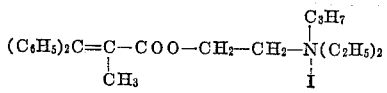

Example 7

A solution of 65 parts of β,β-di(1-naphthyl)-acrylic acid (cf. Weizmann et al., Journal American Chem. Society, volume 70, page 1612: 1948) and 35.5 parts of δ-chlorobutylmorpholine in 300 parts of isopropanol is heated at reflux temperature for 8 hours. The solution is then filtered while hot and the filtrate is concentrated, cooled and treated with dilute hydrochloric acid. The aqueous layer is separated, washed with ether, rendered alkaline by addition of potassium carbonate and extracted with ether. The ether extract is dried over calcium sulfate, stirred with charcoal, filtered and evaporated. 32 parts of the residual oil are dissolved in 200 parts of butanone, treated with 10 parts of methyl chloride and heated in a shielded pressure reactor at 85° C. for 2 hours. After cooling the resulting solid precipitate is recrystallized from a mixture of chloroform and ethyl acetate with charcoal decolorization. The N-(β,β-di-1-naphthylacrylyloxy)butyl-N-methyl-morpholinium iodide is obtained in small, clear prisms which have the structural formula

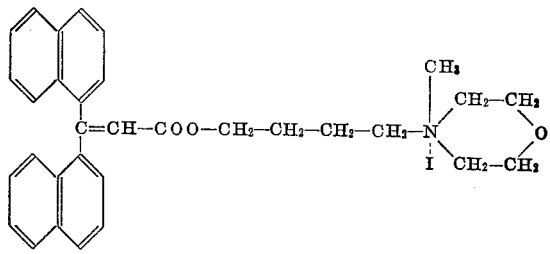

Example 8

A solution of 51 parts of ethyl β,β-diphenylacrylate and 51 parts of N-(β-hydroxyethyl)pyrrolidine in 320 parts of xylene is treated with 0.5 part of sodium metal. The mixture of ethanol and xylene is distilled off gently and as two 130 part portions are removed they are replaced by 85 part portions of xylene. The residue is extracted with water, dried over anhydrous potassium carbonate, filtered and distilled, the β-pyrrolidinoethyl ester of β,β-diphenylacrylic acid being collected at about 183–185° C. and 0.3 mm. pressure. This base forms a crystalline hydrochloride which melts at about 128–129° C.

Treatment of a solution of 15 parts of the basic ester in 80 parts of butanone with 13 parts of methyl bromide produces separation of an oil within 5 minutes which crystallizes on standing at 0° C. Recrystallized from a mixture of chloroform and ethyl acetate, the N-(β,β-diphenylacrylyloxy)ethyl-N-methylpyrrolidinium bromide melts at about 149–151° C. It has the structural formula

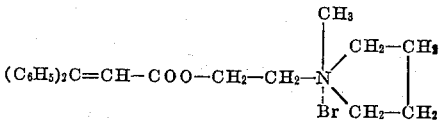

Example 9

A solution of 50 parts of N-(β-hydroxyethyl)-piperidine and 51 parts of ethyl β,β-diphenylacrylate in 320 parts of xylene is treated with 0.5 parts of sodium and heated gently to boiling temperature. The azeotropic mixture of xylene and ethanol is distilled off with gradual replacement by xylene in the course of 2 hours. The residue is diluted with benzene and extracted twice with water, dried and vacuum distilled. The β-piperidinoethyl ester of β,β-diphenylacrylic acid is distilled at about 194–196° C. and 0.3 mm. pressure. On standing this distillate solidifies; the base has a freezing point of about 65° C. The hydrochloride derived therefrom melts at about 169–170° C. upon recrystallization from a mixture of ethanol and ether.

Upon treatment of a solution of 185 parts of the basic ester in 800 parts of butanone with 100 parts of methyl bromide crystals are formed within 10 minutes. Recrystallized from a mixture of chloroform and ethyl acetate the N-(β,β-diphenylacrylyloxy)ethyl-N-methyl-piperidinium bromide melts at about 180–182° C. It has the structural formula

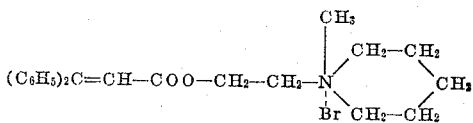

Example 10

A slurry of 49 parts of β,β-diphenyl-β-hydroxy propionic acid with 235 parts of isopropanol is heated at reflux temperature for 2 hours with a 50% xylene solution of 23 parts of β-chloroethyl-dimethylamine. The mixture is filtered and the isopropanol removed from the filtrate under reduced pressure. The semi-crystalline residue is recrystallized from a mixture of ethanol and ether to yield the hydrochloride of the dimethylaminoethyl ester of β,β-diphenylhydracrylic acid, melting at about 172–173° C. 168 parts of this hydrochloride are dissolved in water, rendered alkaline by addition of potassium carbonate and extracted with ether. This ether extract is dried over anhydrous potassium carbonate, filtered and evaporated. The residue is taken up in butanone and 100 parts of methyl bromide are bubbled in. An immediate precipitate of the methobromide forms which is collected on a filter and washed. It melts at about 178–180° C. Preparation of the acrylates of Example 1 by dehydration of these hydracrylates is less efficient than the method shown in Example 1.

Example 11

A mixture of 40 parts of β,β-diphenyl-β-hydroxypropionic acid and 315 parts of isopropanol is stirred and heated to reflux. After slight cooling 22.5 parts of β-chloroethyldiethylamine are added and in the course of the moderately exothermic reaction the slurry turns into a clear solution. Refluxing is continued for 2 hours after which the mixture is filtered hot and the isopropanol is distilled off under vacuum. Recrystallized from a mixture of ethanol and ether the hydrochloride of the β-diethylaminoethyl ester of β,β-diphenylhydracrylic acid is obtained in colorless crystals melting at about 145–146° C. The base is liberated by alkalinization of the hydrochloride, extraction with ether and concentration. Treatment of a butanone solution of the base with methyl bromide yields the crystalline methobromide which melts at about 136–138° C.

Preparation of the acrylic acid derivative of Example 2 by dehydration of the hydracrylic acid derivative is less effective than the method shown in Example 2.

I claim:

1. The quaternary ammonium salts of the cationic formula

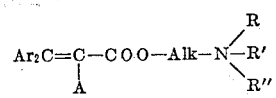

wherein Ar is an aryl hydrocarbon radical of 6 to 10 carbon atoms, A is a member of the class consisting of hydrogen and lower alkyl radicals, Alk is a lower alkylene radical separating the carboxy radical and nitrogen by at least 2 carbon atoms, R is a member of the class consisting of lower alkyl radicals and lower phenylalkyl radicals, and NR'R" is a member of the class consisting of lower dialkylamino radicals, pyrrolidino radicals, piperidino radicals and morpholino radicals.

2. The (β,β - diarylacrylyloxy) alkyltrialkylammonium salts wherein the aryl radicals are aryl hydrocarbon radicals of 6 to 10 carbon atoms, the alkyl radicals are lower alkyl radicals and the nitrogen atom and the carboxyl radical are separated by a lower alkylene radical containing at least 2 carbon atoms.

3. The (β,β-diphenylacrylyloxy) alkyltrialkylammonium salts wherein the alkyl radicals are lower alkyl radicals and the nitrogen atom and the carboxyl radical are separated by a lower alkylene radical containing at least 2 carbon atoms.

4. The (β,β-diphenylacrylyloxy) alkyltrimethylammonium salts wherein the alkyl radical is a lower alkyl radical separating the nitrogen atom and the carboxyl radical by at least 2 carbon atoms.

5. The (β,β-diphenylacrylyloxy) ethyltrimethylammonium salts.

6. The (β,β - diphenylacrylyloxy) alkyldiethylmethylammonium salts wherein the alkyl radical is a lower alkyl radical separating the nitrogen atom and the carboxyl radical by at least 2 carbon atoms.

7. The (β,β - diphenylacrylyloxy) ethyldiethylmethylammonium salts.

8. The (β,β-diphenylacrylyloxy) propyldiethylmethylammonium salts.

9. The N - (β,β - diphenylacrylyloxy) alkyl-N-lower alkylpyrrolidinium salts wherein the nitrogen and carboxyl radicals are separated by a lower alkylene radical containing at least 2 carbon atoms.

10. The N - (β,β-diphenylacrylyloxy) ethyl-N-methylpyrrolidinium salts.

11. The N - (β,β-diphenylacrylyloxy) alkyl-N-lower alkylpiperidinium salts wherein the nitrogen and carboxyl radicals are separated by a lower alkylene radical containing at least 2 carbon atoms.

12. The N - (β,β-diphenylacrylyloxy) ethyl-N-methyl-piperidinium salts.

KURT RORIG.

References Cited in the file of this patent
UNITED STATES PATENTS

| Number | Name | Date |
|---|---|---|
| 1,817,670 | Brill | Aug. 4, 1931 |
| 2,310,973 | Lott | Feb. 16, 1943 |
| 2,475,852 | Northey et al. | July 12, 1949 |